United States Patent
Jang

(10) Patent No.: US 8,228,340 B2
(45) Date of Patent: Jul. 24, 2012

(54) DISPLAY APPARATUS AND CONTROL METHOD THEREOF

(75) Inventor: Mi-sook Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 951 days.

(21) Appl. No.: 12/105,651

(22) Filed: Apr. 18, 2008

(65) Prior Publication Data

US 2009/0073183 A1 Mar. 19, 2009

(30) Foreign Application Priority Data

Sep. 14, 2007 (KR) ........................ 10-2007-0093727

(51) Int. Cl.
- *G09G 5/00* (2006.01)
- *G09G 5/02* (2006.01)
- *H04N 9/64* (2006.01)
- *H04N 5/57* (2006.01)
- *G03F 3/08* (2006.01)
- *G06K 9/00* (2006.01)
- *G06K 9/40* (2006.01)
- *H04N 1/387* (2006.01)
- *G06F 3/00* (2006.01)

(52) U.S. Cl. ........ 345/589; 345/593; 345/594; 345/619; 345/581; 348/256; 348/560; 348/603; 348/649; 358/518; 358/520; 358/452; 382/162; 382/167; 382/254; 382/274; 715/700

(58) Field of Classification Search ................... 345/581, 345/589, 591, 593, 600, 618–619, 594; 348/254–256, 528, 557, 560, 577, 602–603, 348/645, 649; 358/518–520, 448, 452; 382/162, 382/167, 254, 274; 715/700, 722, 764
See application file for complete search history.

(56) References Cited

U.S. PATENT DOCUMENTS

| | | | |
|---|---|---|---|
| 5,198,909 A * | 3/1993 | Ogiwara et al. ............... 358/412 |
| 6,333,752 B1 | 12/2001 | Hasegawa et al. |
| 6,504,551 B1 * | 1/2003 | Takashima et al. ........... 345/649 |
| 6,621,938 B1 | 9/2003 | Tanaka et al. |
| 2003/0068081 A1 | 4/2003 | Jia et al. |
| 2004/0037581 A1 * | 2/2004 | Maeda ............................ 399/82 |
| 2004/0165094 A1 * | 8/2004 | Fukui ........................ 348/333.12 |
| 2004/0264767 A1 * | 12/2004 | Pettigrew ...................... 382/162 |
| 2005/0212814 A1 | 9/2005 | Kubo |
| 2006/0098025 A1 | 5/2006 | Jang et al. |
| 2006/0127114 A1 * | 6/2006 | Mizuno ............................ 399/49 |
| 2006/0280360 A1 * | 12/2006 | Holub ........................... 382/162 |
| 2007/0121141 A1 | 5/2007 | Takabayashi et al. |

OTHER PUBLICATIONS

Extended European Search Report issued on Nov. 30, 2010 in the corresponding European Patent Application No. 08163699.5.
Solorio, M. "Software Review—Synthetic Aperture's Color Finesse v1.0.4", The Ken Stone Index, Dec. 16, 2002, pp. 1-21, http://www.kenstone.net/fcp_homepage/review_color_finesse.html.

* cited by examiner

*Primary Examiner* — Wesner Sajous
(74) *Attorney, Agent, or Firm* — Sughrue Mion, PLLC

(57) ABSTRACT

A display apparatus includes: an image processor which processes image data; a display unit which displays an image based on the image data processed by the image processor; and a controller which controls the image processor to adjust at least one of a hue saturation and R, G and B gains of the image according to a color effect mode selected by a user among a plurality of preset color effect modes.

14 Claims, 6 Drawing Sheets

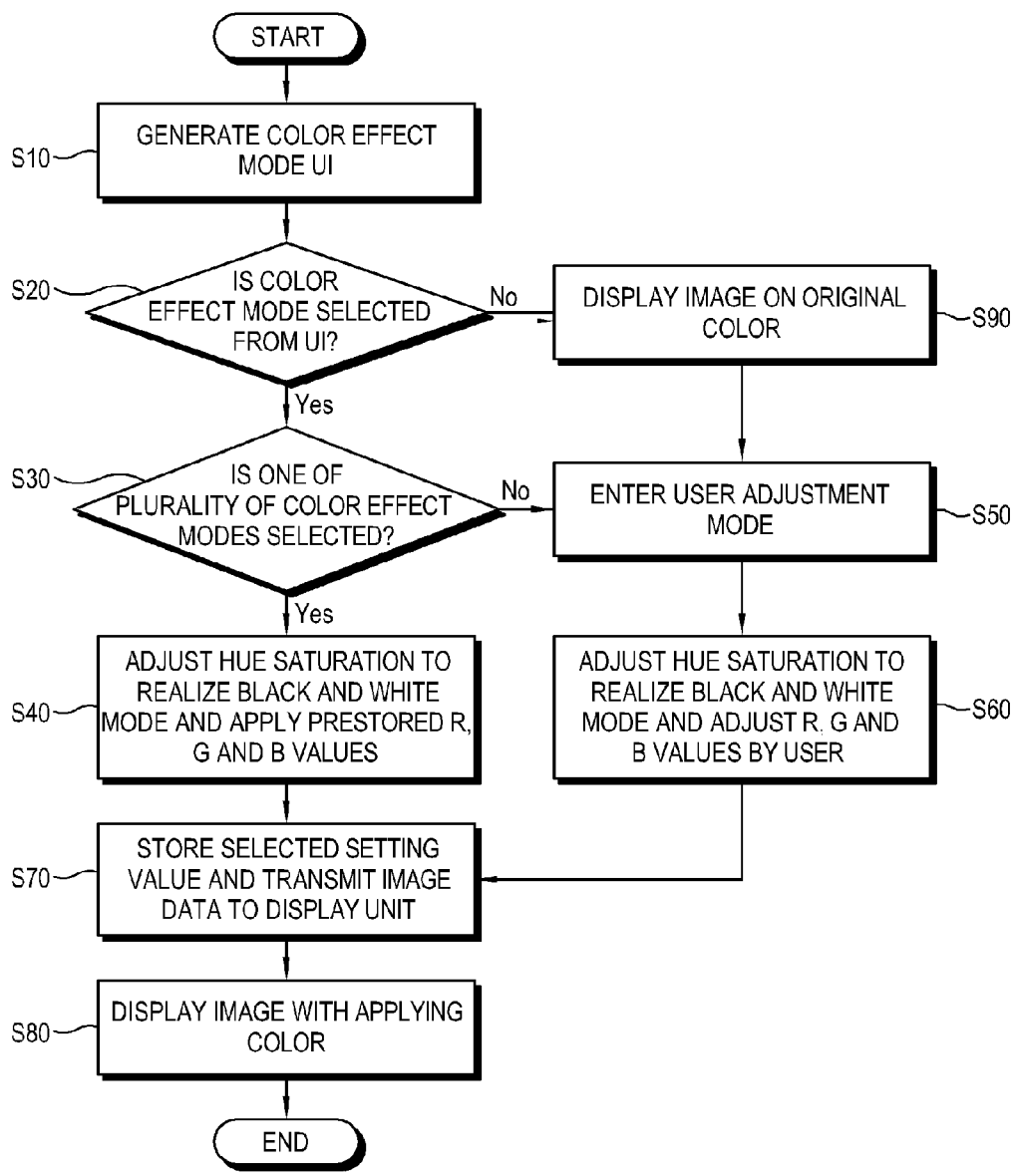

DISPLAY APPARATUS AND CONTROL METHOD THEREOF

CROSS-REFERENCE TO RELATED APPLICATION

This application claims priority from Korean Patent Application No. 10-2007-0093727, filed on Sep. 14, 2007 in the Korean Intellectual Property Office, the disclosure of which is incorporated herein by reference.

BACKGROUND OF THE INVENTION

1. Field of the Invention

Apparatuses and methods consistent with the present invention relate to a display apparatus and a control method thereof, and more particularly, to a display apparatus which adjusts a hue saturation and red (R), green (G), blue (B) gains of an image, and a control method thereof.

2. Description of the Related Art

A display apparatus such as a monitor and a television (TV) receives an image from an image source such as a personal computer (PC) to display a received image thereon. A user of the display apparatus may want to view an image applying various effects to an original property, as well as to view an image with an original property. For example, the applied effects may include black and white, sepia, aqua and green color effect modes supported by a digital camera.

The color effect modes may be realized by a software program for graphic editing. More specifically, the black and white mode may be realized by adjusting a hue saturation of an image to zero. The remaining color effect modes may be realized by adjusting the hue saturation to zero and adjusting red, green and blue gains. A user may select an image corresponding to a desired color effect mode with the graphic editing software program.

As a conventional display apparatus does not support the color effect mode, a computer which is connected with the display apparatus should have the graphic editing software program to realize the color effect modes.

Even if the software program is installed in the computer connected with the display apparatus, the conventional graphic editing software program of the computer is complicated to use. Thus, a user may not be able to easily select the desired color effect mode.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus which applies various color effects to a displayed image more conveniently, and a control method thereof.

According to an aspect of the present invention, there is provided a display apparatus, comprising: an image processor which processes image data; a display unit which displays an image based on the image data processed by the image processor; and a controller which controls the image processor to adjust at least one of a hue saturation and R, G and B gains of the image according to a color effect mode selected by a user among a plurality of preset color effect modes.

The plurality of color effect modes may comprise at least one of a black and white mode, a sepia mode, an aqua mode and a green mode.

The display apparatus may further comprise a user interface (UI) generator which generates a UI having an item to select one of the plurality of color effect modes.

The controller may control the image processor to additionally adjust at least one of the hue saturation and R, G and B gains of the image by a user.

The UI may further comprise another item to additionally adjust at least one of the hue saturation and R, G and B gains of the image.

The controller may store a setting value of the adjusted hue saturation and R, G and B gains of the image.

The display apparatus may further comprise a user input unit through which one of the plurality of color effect modes is selected.

The user input unit may comprise a button to directly select at least one of the plurality of color effect modes.

The display apparatus may further comprise a storage unit which stores setting values of the hue saturation and R, G and B gains in respective color effect modes.

According to another aspect of the present invention, there is provided a control method of a display apparatus, comprising: selecting one of a plurality of preset color effect modes by a user's input; processing image data to adjust at least one of a hue saturation and R, G and B gains of an image according to the selected color effect mode; and displaying the image based on the processed image data.

The plurality of color effect modes may comprise at least one of a black and white mode, a sepia mode, an aqua mode and a green mode.

The control method may further comprise generating a UI which has an item to select one of the plurality of color effect modes.

The UI may further comprise another item to additionally adjust at least one of the hue saturation and R, G and B gains of the image.

The control method may further comprise storing setting values of the adjusted hue saturation and R, G and B gains of the image.

The control method may further comprise receiving a user's selection with respect to one of the plurality of color effect modes.

BRIEF DESCRIPTION OF THE DRAWINGS

The above and/or other aspects of the present invention will become apparent and more readily appreciated from the following description of the exemplary embodiments, taken in conjunction with the accompanying drawings of which:

FIG. 4 is a flowchart to describe a control process of the display apparatus according to the exemplary embodiment of the present invention.

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary.

Figure 1:
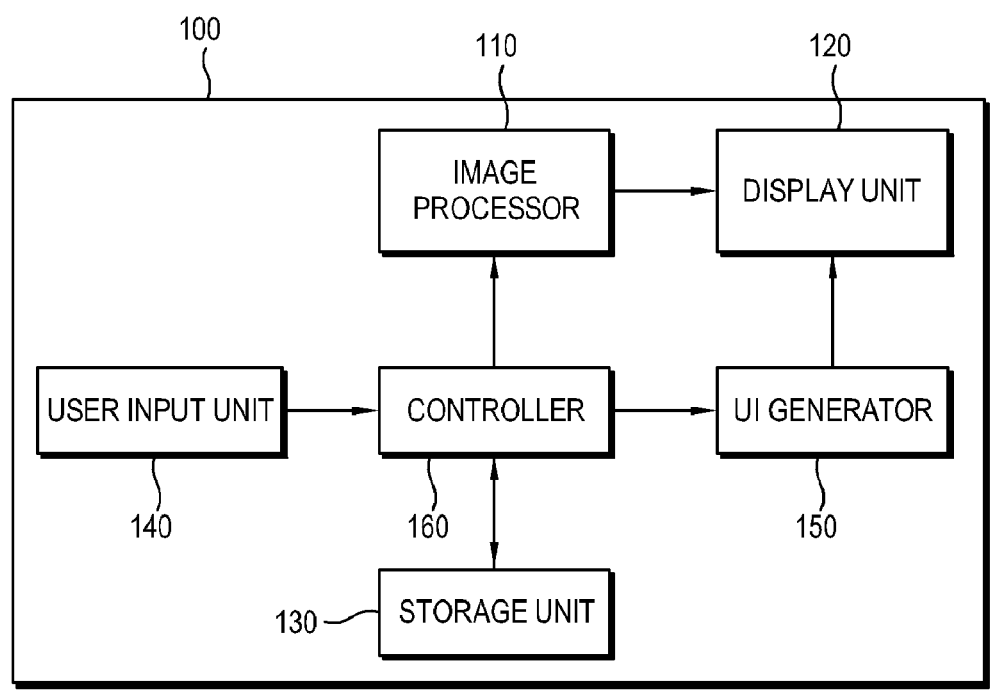
FIG. 1 is a block diagram of a display apparatus according to an exemplary embodiment of the present invention.

FIG. 1 is a block diagram of a display apparatus 100 according to an exemplary embodiment of the present invention. The display apparatus 100 receives an image from an image source (not shown) such as a PC to display a received image thereon. The display apparatus 100 may adjust a property of an input image, i.e., hue saturation and R, G and B gains of the image. For example, the display apparatus 100 may include a TV, a monitor, etc.

As shown in FIG. 1, the display apparatus 100 may include an image processor 110, a display apparatus 120, a storage unit 130, a user input unit 140, a UI generator 150 and a controller 160.

The image processor 110 processes an image input by the image source. An image according to the present exemplary embodiment may be input and processed as image data. According to the present exemplary embodiment, an image source includes a broadcast signal supplying device (not shown) which supplies a broadcast signal including an image. The image processor 110 may adjust the hue saturation and R, G and B gains of the image according to a control of the controller 160.

The display unit 120 displays an image based on the image data processed by the image processor 110. The display unit 120 may include a cathode ray tube (CRT), a liquid crystal display (LCD), a plasma display panel (PDP), etc.

The storage unit 130 stores setting values of the hue saturation and R, G and B gains in each color effect mode. The color effect mode displays an image in a particular color tone. The plurality of color effect modes may include at least one of black and white, sepia (or brown color tone), aqua (or blue color tone) and green modes. The color effect modes have different setting values for the hue saturation and R, G and B gains of image data.

The user input unit 140 receives a user's input to select one of the plurality of color effect modes. The user input unit 140 transmits the user's input to the controller 160. For example, the user input unit 140 may include a remote controller, a control panel, a touch screen, etc.

Figure 2A:
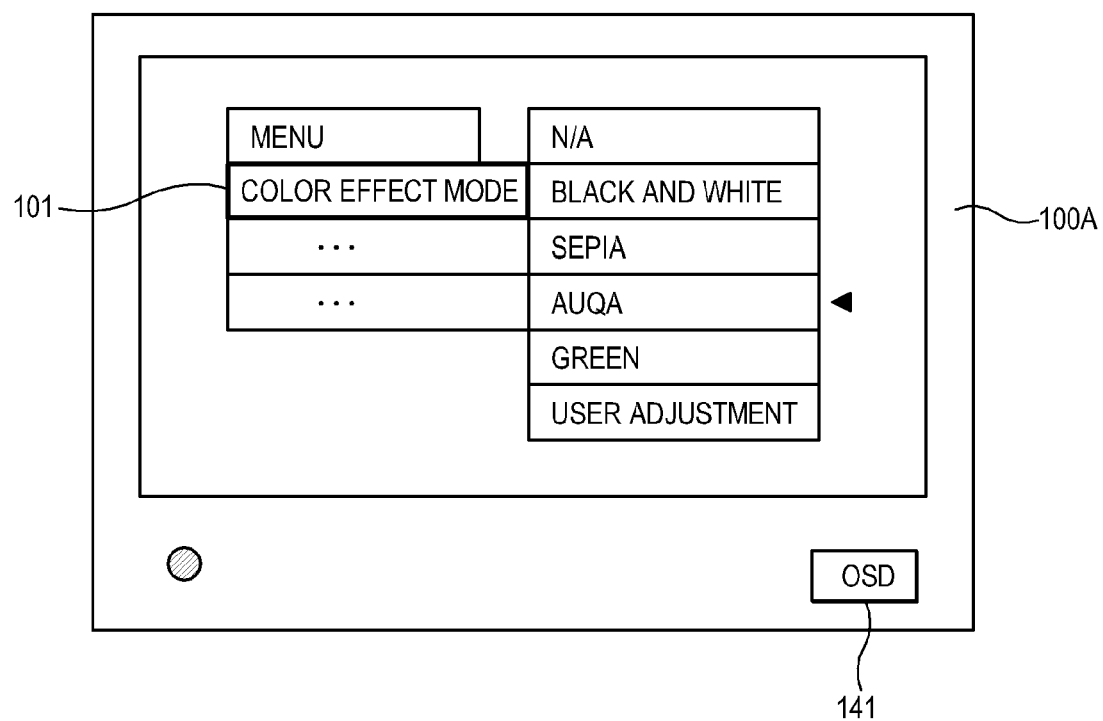
FIGS. 2A, 2B and 2C illustrate a display apparatus according to another exemplary embodiment of the present invention.

As shown in FIG. 2A, a user input unit of a display apparatus 100A may include an on screen display (OSD) button 141. If a user selects the OSD button 141, a UI 101 is displayed to select the color effect modes. As a user selects an item of the UI 101 through the OSD button 141, the desired color effect mode may be applied to the image. The OSD button 141 may be provided as a plurality of buttons.

Figure 2B:
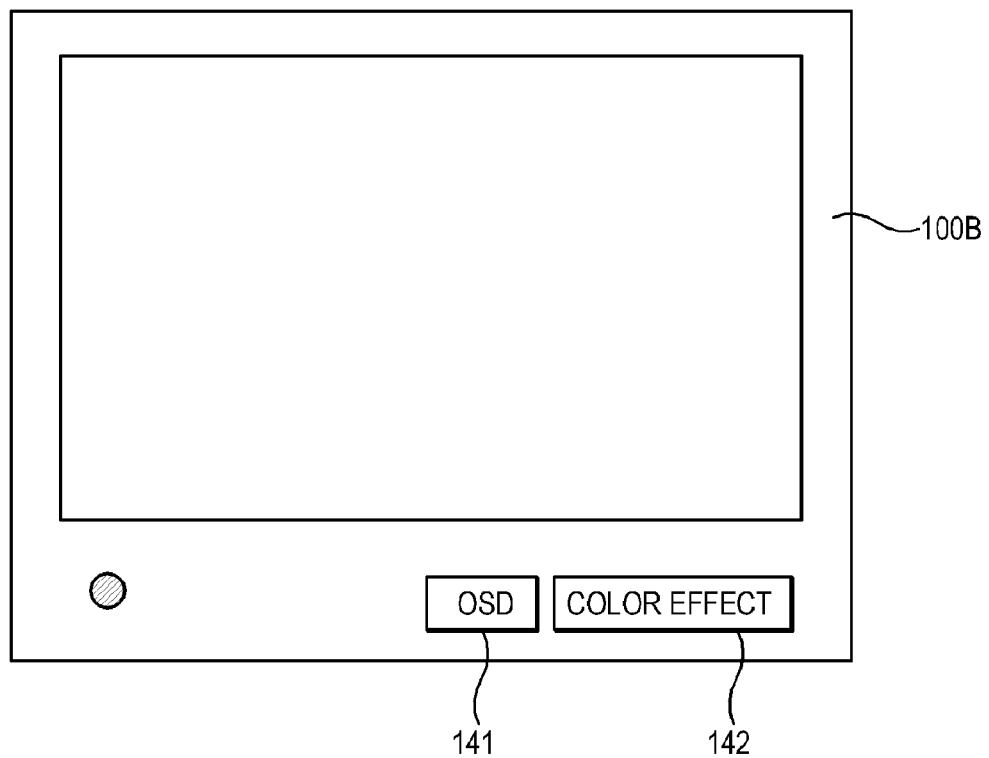
Figure 2C:
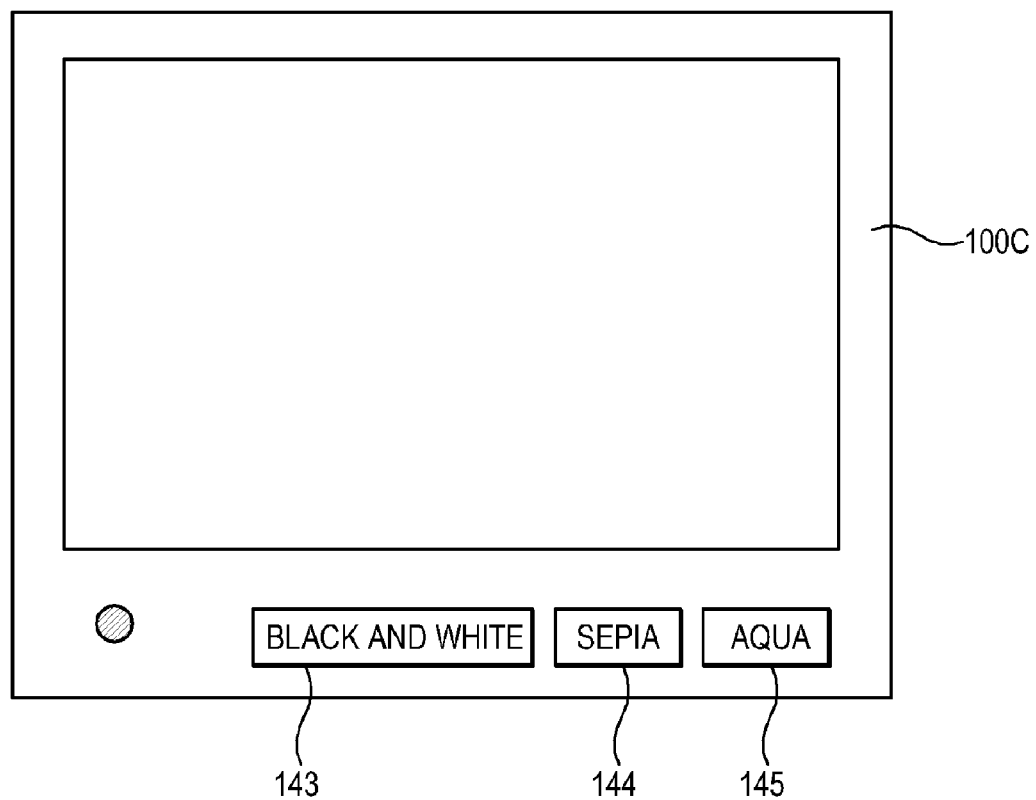

According to another exemplary embodiment, as shown in FIG. 2B, a user input unit of a display apparatus 100B may include a color effect button 142 (hereinafter a "direct button") to directly select one of the plurality of color effect modes. If a user selects the color effect button 142, a preset color effect mode may be automatically applied to an image. As shown in FIG. 2C, a user input unit of a display apparatus 100C may include a black and white button 143, a sepia button 144 and an aqua button 145 as color effect buttons. If a user selects one of the buttons 143, 144 and 145, a color effect mode is directly applied to an image corresponding to the selected button. According to another exemplary embodiment, the user input unit 140 may include both the OSD button 141 and the color effect button 142.

As shown in FIG. 2A, a user may select a function from the UI 101 to conveniently apply the color effect mode to an image. As shown in FIGS. 2B and 2C, a user may apply the color effect mode to an image more rapidly and conveniently through the direct button 142.

The UI generator 150 generates a UI to select one of the plurality of color effect modes. As shown in FIG. 2A, the display apparatus 100 may generate the UI 101 as an OSD, and display it. The UI 101 may include items to select various options such as a color effect mode as a main menu, and items to select a black and white mode, a sepia mode, an aqua mode, a green mode and a user adjustment mode as a sub menu if the color effect mode is selected.

The UI generator 150 may generate a UI to replace at least one of the hue saturation and R, G and B gains of the image data (to replace the determined color effect mode), or to additionally adjust a property of the image data. As shown in FIG. 2A, the UI 101 may provide the user adjustment mode. A user may adjust R, G and B gains from the UI 101 and realize a desired color effect instead of the preset color effect mode.

The controller 160 controls the image processor 110 to adjust at lest one the of the hue saturation and R, G and B gains of the image according to the color effect mode selected by a user among the plurality of preset color effect modes. More specifically, the controller 160 receives the setting value of the selected color effect mode among the setting values of the hue saturation and R, G and B gains in each color effect mode prestored in the storage unit 130, according to the color effect mode selected through the user input unit 140. The controller 160 adjusts the hue saturation and R, G and B gains of the image data processed by the image processor 110, based on the received setting value. Then, the display apparatus 100 may support, e.g., the black and white mode, sepia mode, aqua mode and green mode widely used in digital cameras, with the same effect.

For example, the image processor 110 may be provided in an integrated circuit IC, i.e., a scaler (not shown) which processes an input image signal. The image processor 110 may adjust the hue saturation of the image to realize the black and white mode, and may further adjust the R, G and B gains in the black and white mode to realize the sepia, aqua and green modes.

As shown in FIG. 2A, a user may select a function from the UI 101. As shown in FIGS. 2B and 2C, a user may select the buttons 142, 143, 144 and 145 to directly apply the color effect more rapidly and conveniently.

Figure 3:
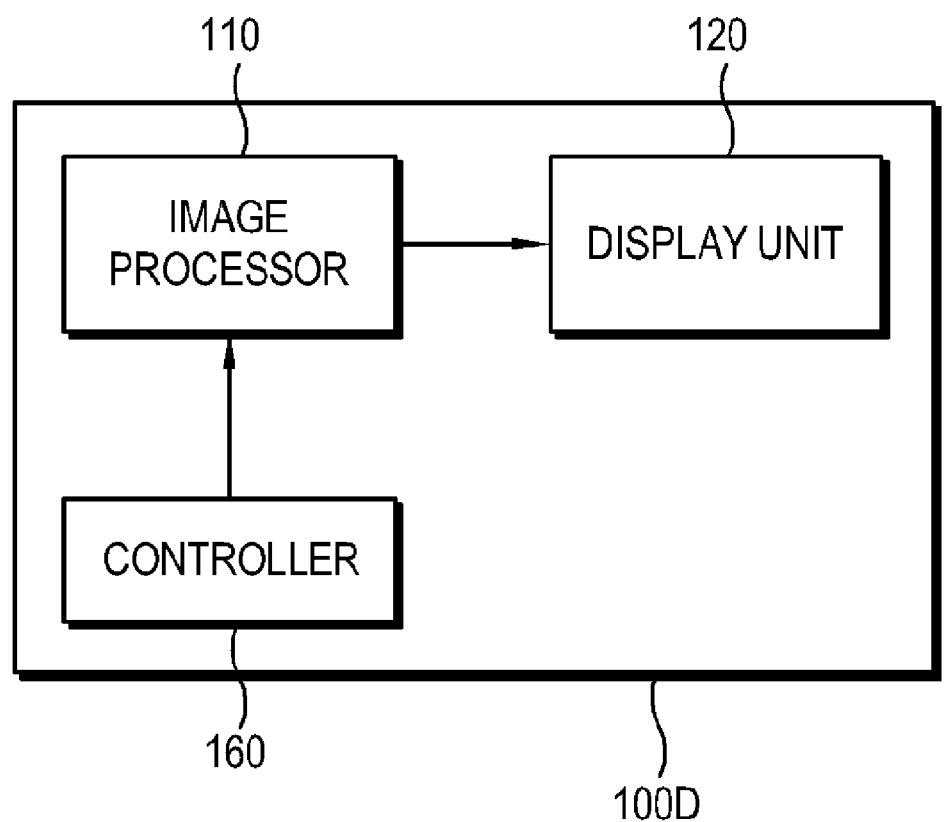
FIG. 3 is a block diagram of a display apparatus according to another exemplary embodiment of the present invention.

FIG. 3 is a block diagram of a display apparatus 100D according to another exemplary embodiment of the present invention. As shown therein, the display apparatus 100D may include an image processor 110, a display unit 120 and a controller 160. Repetitive or similar configurations will be omitted.

Hereinafter, a control method of the display apparatus 100 according to the exemplary embodiment of the present invention will be described.

The display apparatus 100 generates the UI including the color effect modes according to a user's input (S10). For example, as shown in FIG. 2A, the display apparatus 100A may generate the UI 101 as an OSD to be displayed.

The display apparatus 200 determines whether a user selects the color effect mode through the user input unit 140 to apply to the image (S20). If it is determined at operation S20 that a user selects the color effect mode to apply to the image, the display apparatus 100 determines which one is selected from the plurality of color effect modes (S30). As shown in FIGS. 2A to 2C, the OSD button 141, the color effect button 142, the black and white button 143, the sepia button 144 and/or the aqua button 145 may be used to select the color effect mode at operation S30.

If one of the color effect modes is selected at operation S30, the display apparatus 100 adjusts the hue saturation of the image to realize the black and white mode, and then applies the setting value of the R, G and B gains corresponding to the selected color effect mode to change the property of the image (S40).

If it is determined at operation S30 that any of the color effect modes is not selected, the display apparatus 100 executes the user adjustment mode (S50). Then, the display apparatus 100 may adjust the hue saturation and R, G and B gains of the image according to a user's input (S60). According to another exemplary embodiment, operation S50 may be performed together with the operation S40.

The display apparatus 100 then stores the selected setting value in the storage unit 130 (S70). The display apparatus 100 displays the image having the selected color effect (S80).

If it is determined at operation S20 that a user does not select the color effect mode to apply to the image, the display apparatus 100 displays the image without changing the property (S90).

As described above, the exemplary embodiments of the present invention provide a display apparatus which conveniently applies various color effects to a displayed image, and a control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
an image processor which processes image data;
a display unit which displays an image based on the image data processed by the image processor;
a controller which controls the image processor to adjust at least one of a hue saturation and red (R), green (G) and blue (B) gains of the image to predetermined setting values according to a color effect mode selected from among a plurality of preset color effect modes;
a storage unit which stores the predetermined setting values of the hue saturation and the R, G and B gains in the respective color effect modes; and
a user input unit through which one of the plurality of color effect modes is selected,
wherein the image processor includes a scaling unit which is integrated and processes the image data of an image signal received from an external image source to display the image on the display unit;
wherein the display unit displays the adjusted image according to the selected color effect modes when the user input unit selects one of the plurality of color effect modes.

2. The display apparatus according to claim 1, wherein the plurality of color effect modes comprises at least one of a black and white mode, a sepia mode, an aqua mode and a green mode.

3. The display apparatus according to claim 1, further comprising a user interface (UI) generator which generates a UI comprising an item for selecting one of the plurality of color effect modes.

4. The display apparatus according to claim 1, wherein the controller controls the image processor to additionally adjust at least one of the hue saturation and the R, G and B gains of the image by a user.

5. The display apparatus according to claim 4, further comprising a user interface (UI) generator which generates a UI comprising an item to adjust at least one of the hue saturation and the R, G and B gains of the image by the user.

6. The display apparatus according to claim 1, wherein the controller comprises the storage unit.

7. The display apparatus according to claim 5, wherein the setting values are determined through the UI by the user.

8. The display apparatus according to claim 1, wherein the user input unit comprises a button to directly select at least one of the plurality of color effect modes.

9. A control method of a display apparatus including a display unit which displays an image based on image data of an image signal received from an external image source, the control method comprising:
displaying the image
selecting one of a plurality of preset color effect modes; and
adjusting the image according to the selected one of the plurality of preset color effect modes,
wherein the displaying comprises displaying the image by scaling an image based on the image data of the image signal received from the external image source, and
wherein the adjusting comprises adjusting at least one of a hue saturation and red (R), green (G) and blue (B) gains of the image to predetermined setting values, which are stored in the display apparatus, corresponding to the selected color effect mode.

10. The control method according to claim 9, wherein the plurality of color effect modes comprises at least one of a black and white mode, a sepia mode, an aqua mode and a green mode.

11. The control method according to claim 9, further comprising generating a user interface (UI) which comprises an item to select one of the plurality of color effect modes.

12. The control method according to claim 11, wherein the UI further comprises another item to additionally adjust at least one of the hue saturation and R, G and B gains of the image.

13. The control method according to claim 12, wherein the setting values are determined through the UI by a user.

14. The control method according to claim 9, wherein the selecting comprises using a button to directly select the one of the plurality of preset color effect modes.

* * * * *